United States Patent [19]
Bringman, Jr.

[11] Patent Number: 5,154,470
[45] Date of Patent: Oct. 13, 1992

[54] PICKUP TRUCK TAILGATE MOUNTED CARGO APPARATUS

[76] Inventor: Richard L. Bringman, Jr., 3907 Alto Ave., Carrollton, Tex. 75007

[21] Appl. No.: 826,052

[22] Filed: Jan. 27, 1992

[51] Int. Cl.$^5$ .................................... B60P 3/40
[52] U.S. Cl. .................... 296/26; 296/57.1; 296/180.1
[58] Field of Search ............ 296/26, 50, 56, 57.1, 296/37.6, 180.1

[56] References Cited

U.S. PATENT DOCUMENTS

| | | | |
|---|---|---|---|
| 1,655,797 | 1/1928 | Peck | 296/26 |
| 1,667,438 | 4/1928 | Sands et al. | 296/58 |
| 4,451,075 | 5/1984 | Canfield | 296/180.1 X |
| 4,531,773 | 7/1985 | Smith | 296/26 |

Primary Examiner—Dennis H. Pedder
Attorney, Agent, or Firm—Leon Gilden

[57] ABSTRACT

A pickup truck tailgate includes a first plate hingedly mounted thereto, the first plate including a second plate oriented at an obtuse included angle therebetween, with trapezoidal end walls mounted coextensively to the sides of the first and second plates. Third and fourth end walls hingedly mounted to the first and second end walls respectively are arranged for securement to an interior surface of the pickup truck bed when the apparatus is in an extended orientation. Latch mechanism, including a plurality of draw bars pivotally mounted to a mounting plate, are arranged for projection through the respective first and second end walls for reception within the side walls of the pickup truck for latching of the organization during non-use.

4 Claims, 4 Drawing Sheets

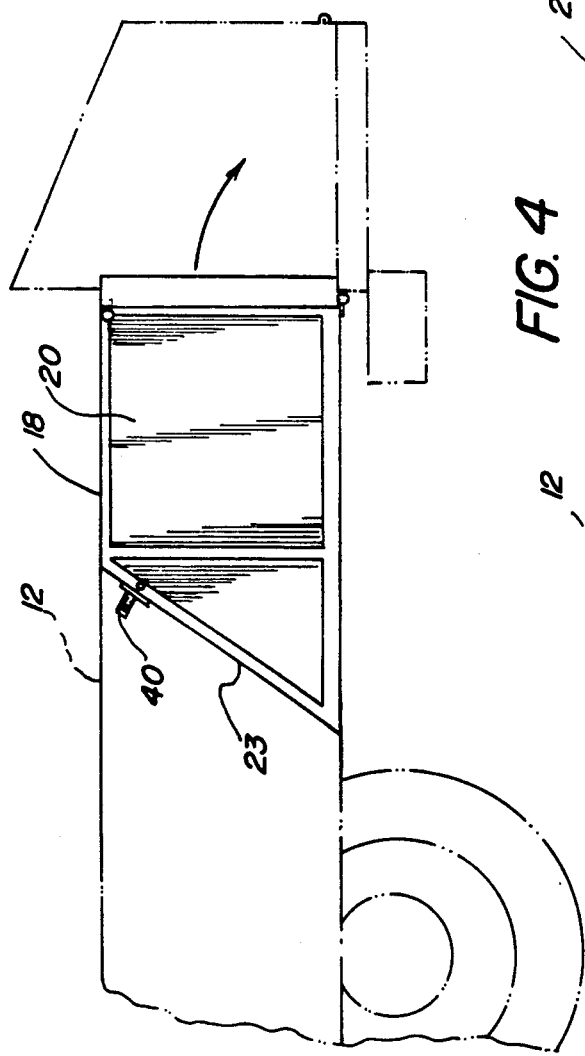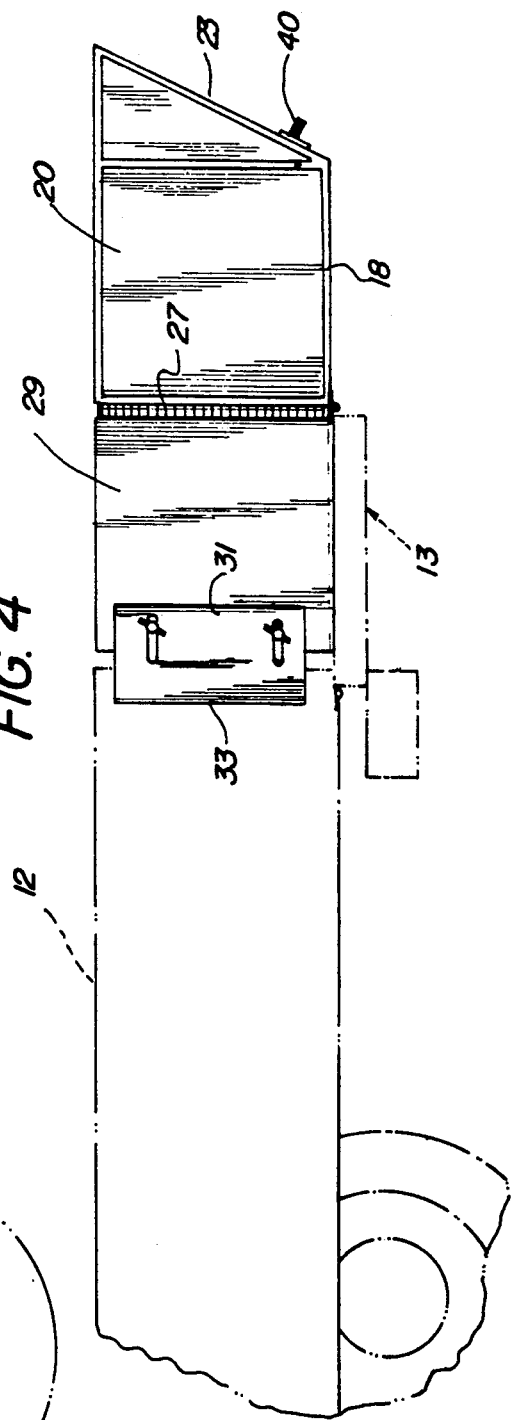

PICKUP TRUCK TAILGATE MOUNTED CARGO APPARATUS

BACKGROUND OF THE INVENTION

1. Field of the Invention

The field of invention relates to pickup truck apparatus, and more particularly pertains to a new and improved pickup truck tailgate mounted cargo apparatus wherein the same is arranged to provide for extension of cargo carrying capacity of pickup trucks, with the apparatus mounted to a tailgate of an associated pickup truck.

2. Description of the Prior Art

Pickup trucks due to convenience of size and construction are limited as to the availability of cargo carrying capacity. The instant invention attempts to overcome deficiencies of the prior art by providing for an organization of compact inter-relationship relative to the pickup truck that is extended relative to the pickup truck tailgate permitting extended cargo carrying capacity of the pickup truck and accordingly, it may be appreciated that there continues to be a need for such apparatus to overcome deficiencies of the prior art and in this respect, the present invention substantially fulfills this need.

SUMMARY OF THE INVENTION

In view of the foregoing disadvantages inherent in the known types of pickup truck apparatus now present in the prior art, the present invention provides a pickup truck tailgate mounted cargo apparatus wherein the same is arranged to extend cargo carrying capacity of an associated pickup truck. As such, the general purpose of the present invention, which will be described subsequently in greater detail, is to provide a new and improved pickup truck tailgate mounted cargo apparatus which has all the advantages of the prior art pickup truck apparatus and none of the disadvantages.

To attain this, the present invention provides a pickup truck tailgate including a first plate hingedly mounted thereto, the first plate including a second plate oriented at an obtuse included angle therebetween, with trapezoidal end walls mounted coextensively to the sides of the first and second plates. Third and fourth end walls hingedly mounted to the first and second end walls respectively are arranged for securement to an interior surface of the pickup truck bed when the apparatus is in an extended orientation. Latch mechanism, including a plurality of draw bars pivotally mounted to a mounting plate, are arranged for projection through the respective first and second end walls for reception within the side walls of the pickup truck for latching of the organization during non-use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pickup truck tailgate mounted cargo apparatus which has all the advantages of the prior art pickup truck apparatus and none of the disadvantages.

It is another object of the present invention to provide a new and improved pickup truck tailgate mounted cargo apparatus which may be easily and efficiently manufactured and marketed.

It is a further object of the present invention to provide a new and improved pickup truck tailgate mounted cargo apparatus which is of a durable and reliable construction.

An even further object of the present invention is to provide a new and improved pickup truck tailgate mounted cargo apparatus which is susceptible of a low cost of manufacture with regard to both materials and labor, and which accordingly is then susceptible of low prices of sale to the consuming public, thereby making such pickup truck tailgate mounted cargo apparatus economically available to the buying public.

Still yet another object of the present invention is to provide a new and improved pickup truck tailgate mounted cargo apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic side view of the invention in a phantom orientation relative to a first closed position and a second intermediate position.

FIG. 4 is an orthographic side view of the invention in an extended orientation.

DESCRIPTION OF THE PREFERRED EMBODIMENT

Figure 1:
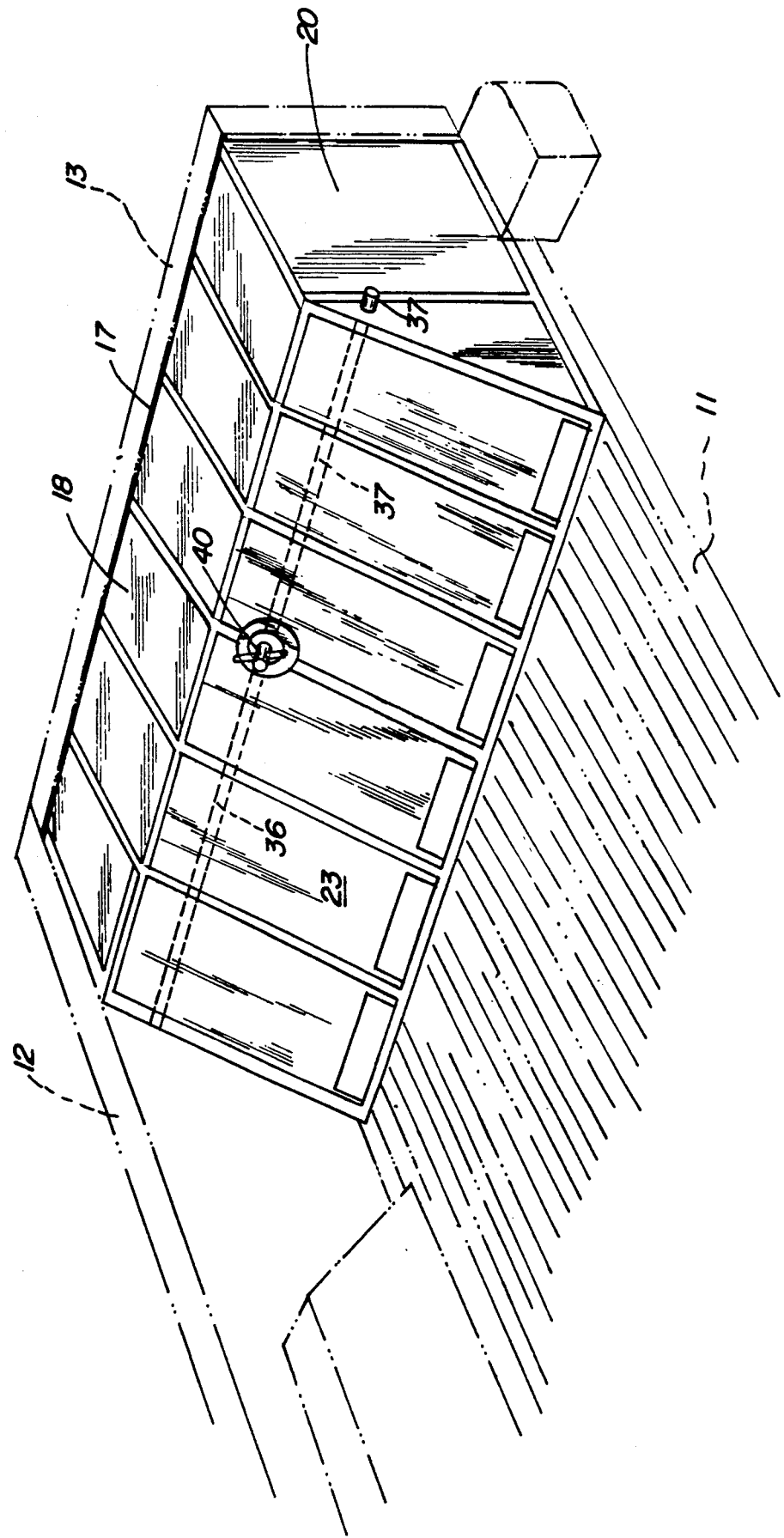
FIG. 1 is an isometric illustration of the instant invention in a closed configuration relative to a pickup truck bed.
Figure 2:
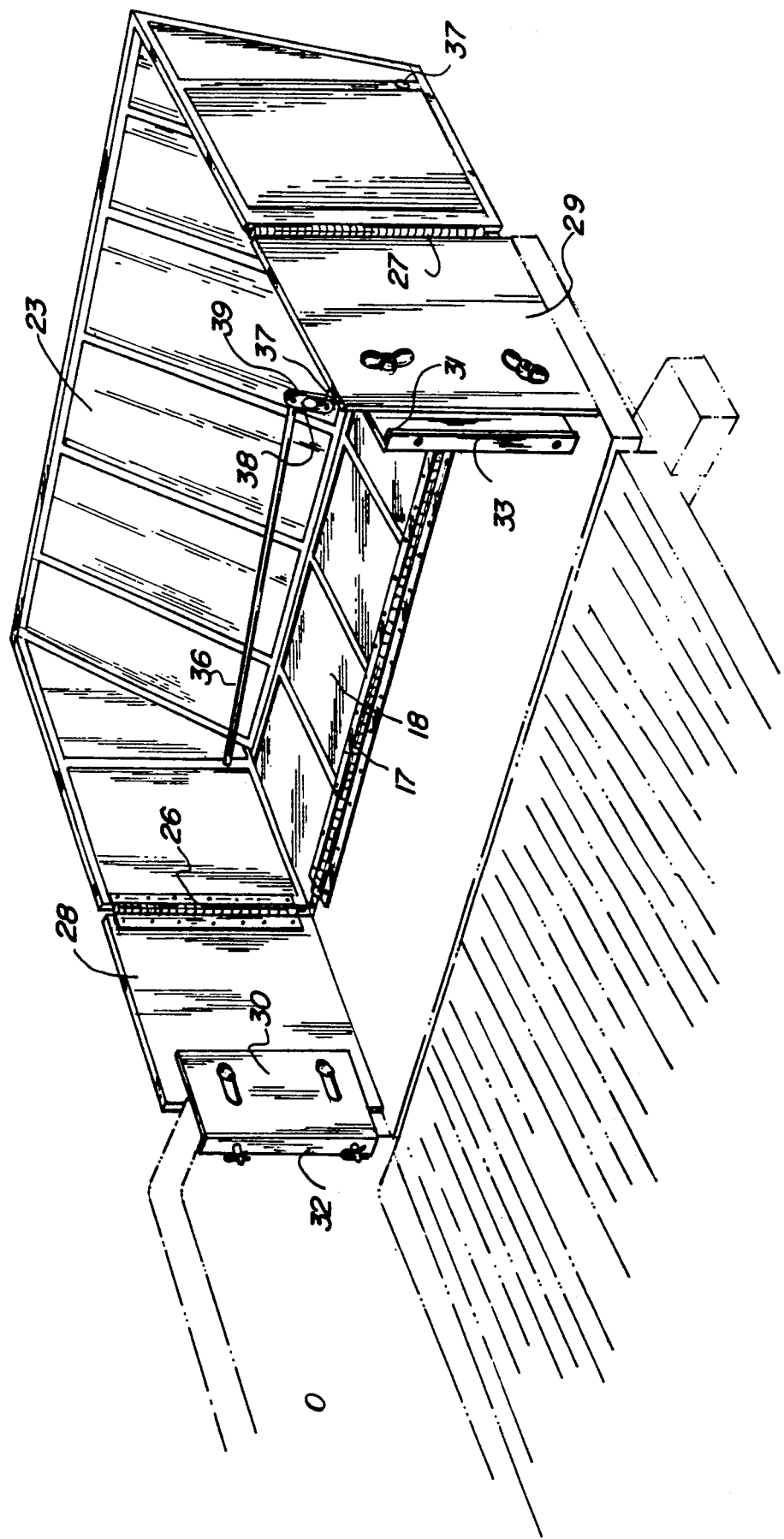
FIG. 2 is an isometric illustration of the invention in an opened configuration.
Figure 5:
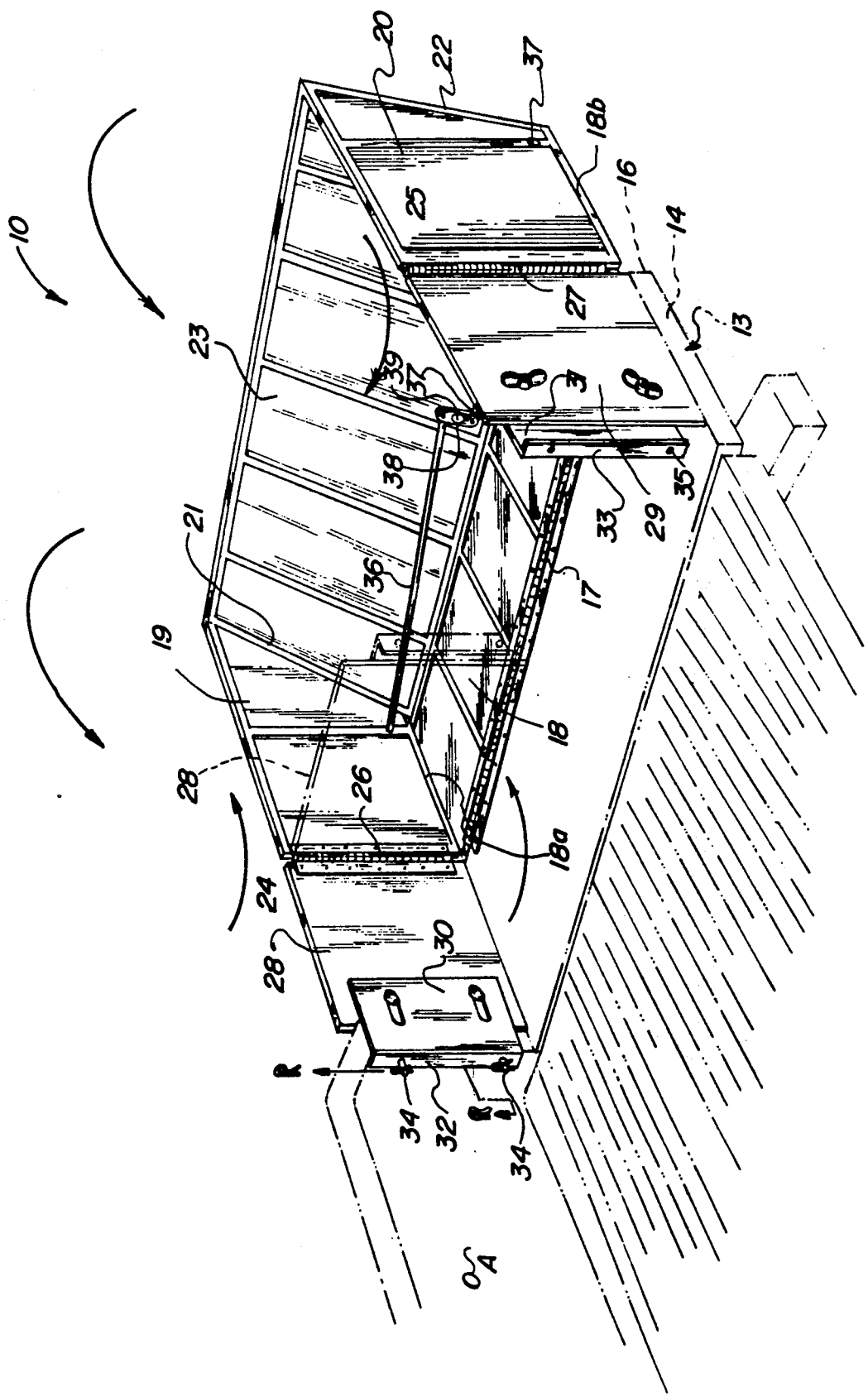
FIG. 5 is an isometric illustration of the invention illustrating the various components for pivotal mounting relative to each other.

With reference now to the drawings, and in particular to FIGS. 1 to 5 thereof, a new and improved pickup truck tailgate mounted cargo apparatus embodying the principles and concepts of the present invention and generally designated by the reference numeral 10 will be described.

More specifically, the pickup truck tailgate mounted cargo apparatus 10 of the instant invention essentially comprises the organization mounted to a pickup truck that includes a truck bed floor 11 with spaced side walls 12. For purposes of clarity of the invention, one such side wall 12 is illustrated but it should be understood as conventionally manufactured in the pickup truck industry that the side walls 12 are parallel and coextensive on opposed sides of the floor 11. A tailgate 13 that includes spaced parallel tailgate side walls 14 spaced apart a predetermined length is provided to include a first end wall mounted to the floor 11 spaced from and parallel to a second end wall 16.

The apparatus is arranged to include a first hinge 17 mounted adjacent the tailgate second end wall 16 (see FIG. 5) and to a first support plate 18 at a rear end wall of the first support plate 18. The first support plate 18 includes spaced first and second support plate first and second end walls 18a and 18b (see FIG. 5) spaced apart the predetermined length substantially equal to the predetermined length of the tailgate 13 between the side walls 14. Second support plate 23 is integrally mounted to a forward end wall of the first support plate 18 defining an obtuse included angle between the second support plate 23 and the first support plate 18. A first trapezoidal end wall 19 and a second trapezoidal end wall 20 are arranged in a parallel spaced relationship spaced apart the predetermined length and mounted to the first support plate's respective first and second end walls 18a and 18b extending orthogonally and upwardly thereof. The first and second end walls 19 and 20 include respective first and second end wall canted forward ends 21 and 22 defining the obtuse included angle between the first and second end wall canted forward ends 21 and 22 and the first support plate 18.

The first end wall 19 includes a first end wall rear end wall orthogonally oriented relative to the first support plate rear end wall and parallel to a second end wall rear end wall 25 formed at a rear end portion of the second end wall 20. A first end wall hinge 26 is hingedly mounted to the first end wall rear end wall 24 and to a third end wall forward end. A second end wall rear end wall 25 includes a second end wall hinge 27 that is further mounted to a fourth end wall 29. The third and fourth end walls 28 and 29 are arranged parallel relative to one another in the second position, as illustrated in the FIG. 5. The third end wall 28 includes a first clamp plate 32 orthogonally formed to a forward end of the third end wall 28, with a second clamp plate 33 orthogonally formed to a forward end of the fourth end wall 29 as the clamp plates are spaced relative to the first and second hinges 26 and 27 and arranged for securement within the tailgate side walls, and more specifically are arranged to receive pins 34 through associated apertures 35 utilizing cooperating lock pin structure directed through the pins when directed through the apertures.

The organization further includes a first and second draw bar 36 and 37 mounted to a rear surface of the second support plate 23 and are pivotally mounted to a mounting plate 38 to opposed ends thereof, with a mounting plate axle 39 directed orthogonally relative to the mounting plate 38 and through the second support plate 23, with an axle handle 40 mounted to the mounting plate axle 39 spaced from an outer surface of the second support plate 23. The draw bars 36 and 37 are arranged for reception within apertures A of a type as illustrated in the FIG. 5, wherein first and second draw bars 36 and 37 are arranged for projection through the respective first and second end walls 19 and 20 in a latched orientation for registration within the side wall apertures A.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A pickup truck tailgate mounted cargo apparatus secured in cooperation with a pickup truck to include a pickup truck bed floor, the pickup truck bed floor including spaced pickup truck side walls, and a tailgate hingedly mounted to the floor at a first end of the tailgate, a second end of the tailgate spaced from the first end, and the tailgate including spaced tailgate side walls spaced apart a predetermined length, and the apparatus comprising, a first support plate, the first support plate including a first support plate rear end wall spaced from a first support plate forward end wall, and the first support plate including a first support plate first end wall and a first support plate second end wall spaced apart the predetermined length, and a first hinge mounted to the first support plate adjacent the first support plate rear end wall and the first hinge mounted to the tailgate adjacent the tailgate second end, and a second support plate fixedly mounted to the first support plate at the first support plate forward end wall, with the second support plate coextensive with the first support plate, and the second support plate defining an obtuse included angle between the first support plate and the second support plate, and a first trapezoidal end wall orthogonally mounted to the first support plate coextensive with the first support plate first end wall, and a second trapezoidal end wall fixedly and orthogonally mounted to the first support plate at the first support plate second end wall, the first trapezoidal end wall and the second trapezoidal end wall arranged in a parallel relationship, and first securement means mounted to the first trapezoidal end wall for securement to one of said pickup truck side walls, and second securement means mounted to the second trapezoidal end wall for securement to a further of said pickup truck side walls.

2. An apparatus as set forth in claim 1 wherein the first securement means includes a third end wall, the third end wall including a third end wall forward end, the third end wall forward end including a first end wall hinge mounted to the third end wall and to the first trapezoidal end wall, and the second securement means including a second end wall hinge mounted to a fourth end wall and to the second trapezoidal end wall, the third end wall further including a first clamp plate, the fourth end wall including a fourth clamp plate, the first clamp plate including a first clamp plate flange orthogonally mounted to the first clamp plate, the second clamp plate including a second clamp plate flange orthogonally mounted to the second clamp plate, the first and second clamp plate flanges each including flange apertures directed therethrough for receiving pin members mounted within the pickup truck side walls.

3. An apparatus as set forth in claim 2 including lock means mounted through at least one of said trapezoidal end walls for engagement with the pickup truck side walls.

4. An apparatus as set forth in claim 3 wherein the lock means includes a first draw bar slidably directed through the first trapezoidal end wall, and a second draw bar slidably directed through the second trapezoidal end wall, the first draw bar and the second draw bar pivotally mounted to a mounting plate, the mounting plate including a mounting plate axle orthogonally directed into the mounting plate, the mounting plate axle extending through the second support plate, and an axle handle fixedly mounted to the mounting plate axle.

* * * * *